(12) United States Patent
Ghosh

(10) Patent No.: US 11,563,329 B2
(45) Date of Patent: Jan. 24, 2023

(54) DELIVERY OF ELECTRICAL POWER

(71) Applicant: EE Limited, Hatfield (GB)

(72) Inventor: Ayan Ghosh, London (GB)

(73) Assignee: EE Limited, Hatfield (GB)

( * ) Notice: Subject to any disclaimer, the term of this patent is extended or adjusted under 35 U.S.C. 154(b) by 915 days.

(21) Appl. No.: 16/325,814

(22) PCT Filed: Aug. 15, 2017

(86) PCT No.: PCT/EP2017/070689
§ 371 (c)(1),
(2) Date: Feb. 15, 2019

(87) PCT Pub. No.: WO2018/036870
PCT Pub. Date: Mar. 1, 2018

(65) Prior Publication Data
US 2021/0323697 A1 Oct. 21, 2021

(30) Foreign Application Priority Data
Aug. 22, 2016 (EP) ..................................... 16185219

(51) Int. Cl.
*H02J 4/00* (2006.01)
*H02J 13/00* (2006.01)
(Continued)

(52) U.S. Cl.
CPC .................. *H02J 4/00* (2013.01); *B64B 1/50* (2013.01); *B64F 3/02* (2013.01); *H02J 3/14* (2013.01);
(Continued)

(58) Field of Classification Search
CPC .. B64F 3/02; H04B 7/18504; H02J 13/00002; B64B 1/50
See application file for complete search history.

(56) References Cited

U.S. PATENT DOCUMENTS 4,842,221 A   6/1989 Beach et al.
6,325,330 B1  12/2001 Lavan, Jr.
(Continued)

FOREIGN PATENT DOCUMENTS

CN    102923314 A    2/2013
CN    103754373 A    4/2014
(Continued)

OTHER PUBLICATIONS

International Search Report and Written Opinion for corresponding PCT Application No. PCT/EP2017/070690, dated Nov. 23, 2017, 14 pages.
(Continued)

*Primary Examiner* — Carlos Amaya
(74) *Attorney, Agent, or Firm* — Patterson Thuente, P.A.

(57) ABSTRACT

A tethered aircraft or balloon carrying a communications base station for rapid deployment in emergency situations. Electrical power is delivered from a generator on the ground using a pulsed electrical supply system in which each power pulse is delivered over a cable and acknowledged, and pulses only continue to be delivered whilst such acknowledgements are received by the ground station. This reduces the risks associated with delivering electrical power over an aerial tether, and avoids the need for an earth (ground) connection, reducing the risk from lightning.

18 Claims, 3 Drawing Sheets

(51) Int. Cl.
*B64B 1/50* (2006.01)
*B64F 3/02* (2006.01)
*H02J 3/14* (2006.01)

(52) U.S. Cl.
CPC .. *H02J 13/00002* (2020.01); *H02J 13/00006* (2020.01); *H02J 13/00024* (2020.01); *H02J 13/00012* (2020.01); *H02J 2310/44* (2020.01)

(56) References Cited

U.S. PATENT DOCUMENTS

| | | | |
|---|---|---|---|
| 8,068,937 | B2 | 11/2011 | Eaves |
| 8,781,637 | B2 | 7/2014 | Eaves |
| 9,184,795 | B2 | 11/2015 | Eaves |
| 2007/0200027 | A1* | 8/2007 | Johnson ............... B64C 39/022 244/3.1 |
| 2009/0204268 | A1* | 8/2009 | Eaves ..................... H02H 3/30 700/295 |
| 2012/0075759 | A1 | 3/2012 | Eaves |
| 2012/0112008 | A1 | 5/2012 | Holifield et al. |
| 2013/0103220 | A1 | 4/2013 | Eaves |
| 2014/0233412 | A1 | 8/2014 | Mishra et al. |
| 2015/0041598 | A1 | 2/2015 | Nugent et al. |
| 2015/0215001 | A1 | 7/2015 | Eaves |
| 2016/0046387 | A1 | 2/2016 | Frolov et al. |
| 2016/0111877 | A1 | 4/2016 | Eaves et al. |
| 2016/0134331 | A1 | 5/2016 | Eaves |
| 2016/0191142 | A1 | 6/2016 | Boss et al. |
| 2016/0291589 | A1 | 10/2016 | Ashoori et al. |
| 2020/0028569 | A1 | 1/2020 | Ghosh et al. |

FOREIGN PATENT DOCUMENTS

| | | |
|---|---|---|
| CN | 203638106 U | 6/2014 |
| CN | 105083520 A | 11/2015 |
| CN | 206012962 U | 3/2017 |
| GB | 2482340 A | 2/2012 |
| RU | 2182544 C2 | 5/2002 |
| WO | WO 2002/001756 A1 | 1/2002 |
| WO | WO 2002/061971 A1 | 8/2002 |
| WO | WO 2009/005875 A2 | 1/2009 |
| WO | WO-2009005875 A3 | 4/2009 |
| WO | WO-2013013219 A1 | 1/2013 |
| WO | WO 2014/089329 A2 | 6/2014 |
| WO | WO 2015/139733 A1 | 9/2015 |
| WO | WO 2016/012055 A1 | 1/2016 |
| WO | WO-2017218120 A1 | 12/2017 |
| WO | WO 2018/036870 A1 | 3/2018 |

OTHER PUBLICATIONS

Extended European Search Report corresponding EP Application No. 16191547.5, dated Mar. 31, 2017, 14 pages.
GB Search and Examination Report for GB Application No. GB 1616558.1; dated Mar. 8, 2017; 5 pages.
Tian He et al: "VigiiNet: An Integrated Sensor Network System for Energy-Efficient Surveillance", ACM Transactions on Sensor Networks, Acm, 2 Penn Plaza, Suite 701 New York NY 10121-0701 USA, val. 2, No. 1, Feb. 1, 2006, pp. 1-38.
Valcarce et al: "Airborne Base Stations for Emergency and Temporary Events" In: Lecture Notes of the Institute for Computer Sciences, Social Informatics and Telecommunications Engineering, Jun. 27, 2013 (Jun. 27, 2013), Springer, DE, XP055357418, ISSN: 1867-8211 ISBN: 978-3-642-17758-3 val. 123, pp. 13-25, DOI: 1 0.1 007 /978-3-319-02762-3_2; 12 pages.
Zhenhong et al: "A Rapid and Reliable Disaster Emergency Mobile Communication System via Aerial Ad Hoc BS Networks", Wireless Communications, Networking and Mobile Computing (WICOM), 2011 7th International Conference on, IEEE, Sep. 23, 2011, pp. 1-4, ; 4 pages.
Chandrasekharan et al: "Designing and Implementing Future Aerial Communication Networks", IEEE Communications Magazine, IEEE Service Center, Piscataway, US; May 1, 2016; 9 pages.
Application and Filing Receipt for U.S. Appl. No. 16/338,158, filed Mar. 29, 2019, Inventor(s): Ghosh et al.
International Search Report and Written Opinion for corresponding PCT Application No. PCT/EP2017/070689, dated Oct. 11, 2017, 10 pages.
Kolar, et al.; "Conceptualization and Multiobjective Optimization of the Electric System of an Airborne Wind Turbine", IEEE Journal of Emerging and Selected Topics in Power Electronics, vol. 1, No. 2, 2168-6777. Jun. 2013; 31 pages.
GB Search Report from corresponding GB Application No. GB1614341. 4, search completed: Feb. 2, 2017.
Communication pursuant to Article 94(3) EPC for European Application No. 17755145.4, dated Sep. 17, 2021, 6 pages.
Extended European Search Report for Application No. EP17204491. 9, dated Apr. 16, 2018, 7 pages.
Extended European Search Report for Application No. EP16185219. 9, dated Dec. 31, 2016, 8 pages.
Great Britain Combined Search and Examination Report for Application No. GB1614341.4, dated Feb. 3, 2017, 4 pages.
Great Britain Examination Report for Application No. GB1719857. 3, dated May 18, 2018, 5 pages.
International Search Report and Written Opinion for Application No. PCT/EP2018/082351, dated Jan. 31, 2019, 9 pages.
International Preliminary Report on Patentability for Application No. PCT/EP2017/070689, dated Mar. 7, 2019, 8 pages.
Office Action for Chinese Application No. 201880073406.9, dated May 6, 2021, 2 pages.
Office Action for Chinese Application No. 201880073406.9, dated Nov. 18, 2020, 9 pages.

* cited by examiner

DELIVERY OF ELECTRICAL POWER

CROSS-REFERENCE TO RELATED APPLICATION

The present application is a National Phase entry of PCT Application No. PCT/EP2017/070689, filed Aug. 15, 2017, which claims priority from EP Patent Application No. 16185219.9 filed Aug. 22, 2016 each of which is hereby fully incorporated herein by reference.

TECHNICAL FIELD

The present disclosure relates to the delivery of electrical power to a load at a location remote from the power source.

BACKGROUND

A pulsed electrical supply system is disclosed in U.S. Pat. Nos. 8,068,937, 8,781,637, and 9,184,795, and Publication Nos. 2015/0215001, 2016/0111877 and 2016/0134331 (all to Eaves), which provide a system which regulates the transfer of energy from a power source to a load, with each pulse being monitored at the load and reported to the source over a communications connection before the next pulse is transmitted. The power received in each pulse is measured by a controller associated with the load and reported to a controller associated with the source, and the source only transmits a further pulse if the reported power in the first pulse corresponds with the power transmitted by the source. Thus the power is automatically shut down in the event of a discrepancy between the reported power of the received pulse and the power in the pulse originally transmitted, allowing for power losses caused by the resistance of in the cable, which should remain constant for each pulse.

Such discrepancies may be caused by a break in the cable, in which case the load end controller does not detect the pulse at all, but the system can also respond to smaller changes in power delivery. A reduction in power, indicative of increased resistance in the circuit, may indicate a loss of circuit continuity such as may be caused by a fraying cable, which can lead to overheating, or a broken cable in which the free ends may be in contact with a poor conductor such as the ground, or a person. Reduced resistance can be caused by a short-circuit ("shunt") between the two legs (positive and negative, or live and neutral) of the circuit, such as a direct connection between them, or some object coming into contact with both legs and providing a second path, in parallel with the load.

This pulsed system has been proposed for a number of applications in which a failsafe electricity supply is to be delivered to a publically accessible location.

SUMMARY

The present disclosure adapts this technology for a different purpose to provide power to tethered aircraft.

Tethered aircraft, including both buoyant and heavier-than-air craft such as drones, are used for a wide range of applications for observation, surveillance and communications purposes. The embodiments to be described herein are particularly intended for use as temporary platforms for communications base stations in situations in which no fixed communications infrastructure is available, either because of damage to a permanent facility or to meet a temporary requirement for extra communications capacity. Such circumstances may arise because of natural disasters or planned events attracting large numbers of people, such as sporting events passing through normally remote areas. Another application of temporary platforms is for so-called "drive tests" to identify suitable sites for future platforms or identify areas of poor coverage.

The communications facilities that can be offered by such platforms can include operation as a cellular base station, a microwave relay station or any other wireless communication system. Both the uplink and backhaul can be provided wirelessly. However, communications platforms require a power supply. If the aircraft is a heavier-than air device, such as an unmanned "drone", power is also needed to keep it airborne. Batteries have a limited life before recharging is necessary. Collection of energy on board from external sources such as solar power is impractical because of the weight and expense of the collection equipment (e.g. solar panels), and does not remove the need for batteries as the power sources are intermittent.

Delivery of a conventional electrical power supply through a cable from a power source on the ground requires a conductive path between the aircraft and a power supply on the earth's surface. This can be potentially hazardous as it is possible for the tether, and therefore the associated conductor, to become damaged, severed, or entangled in vegetation or other objects, resulting in an electrically live cable coming into contact with objects on the ground. It is not always practical to provide a reliable earth connection to the cable, for example if the power-generation equipment is mounted on a rubber-tired vehicle. Indeed, an earth connection can be undesirable because of the risk of the tether acting as a lightning conductor in the event of atmospheric electrical activity.

For the avoidance of doubt, the terms "ground"/"grounded" are used in this specification in the sense of the physical surface on which objects stand when they are not airborne, whilst "earth"/"earthed" are used in the electrical sense of zero electrical potential relative to the ground.

According to the present disclosure, there is provided an aircraft (which may be a captive balloon or a tethered powered heavier-than-air craft) comprising a connection point for a tether, an electrical power connection for receiving electrical power through a cable from a remote source, a receiving unit for a pulsed electrical delivery system connected through the electrical connection, a monitoring unit for detecting electrical pulses received by the receiving unit, and a communications transmitter for transmitting a signal in response to detection of electrical pulses by the monitoring unit.

According to another aspect, there is provided a method of delivery of electrical power to an aircraft connected to the ground by a tether, comprising the delivery of electrical pulses to the airborne device from a ground-based device over an electrical connection, wherein the airborne device transmits acknowledgements of the pulses, and the ground based device transmits each pulse in response to acknowledgement of a previous pulse, and suspends transmission if no acknowledgement is received.

Before transmission is suspended, one or more pulses may be transmitted at reduced power to test the connection.

A backhaul connection to a communications network may be provided from the airborne device through the ground-based device.

The electrical connection can be a cable associated with the tether. The aircraft can comprise wireless communications equipment powered by the pulsed electrical delivery system, for operation as a communications base station. The communications transmitter can be configured to report a power level of pulses detected by the monitoring unit. The communications transmitter may transmit the signals over a wireless interface, or over a wired communications connection associated with the electrical power connection.

The aircraft may enter a controlled descent mode in the event that the monitoring unit detects no electrical pulses within a predetermined period. The wireless communications equipment may be automatically disconnected from the power supply when the aircraft is not airborne.

BRIEF DESCRIPTION OF THE DRAWINGS

An embodiment of the disclosure will be described by way of example with reference to the drawings accompanying this specification, in which.

DETAILED DESCRIPTION

Figure 1:
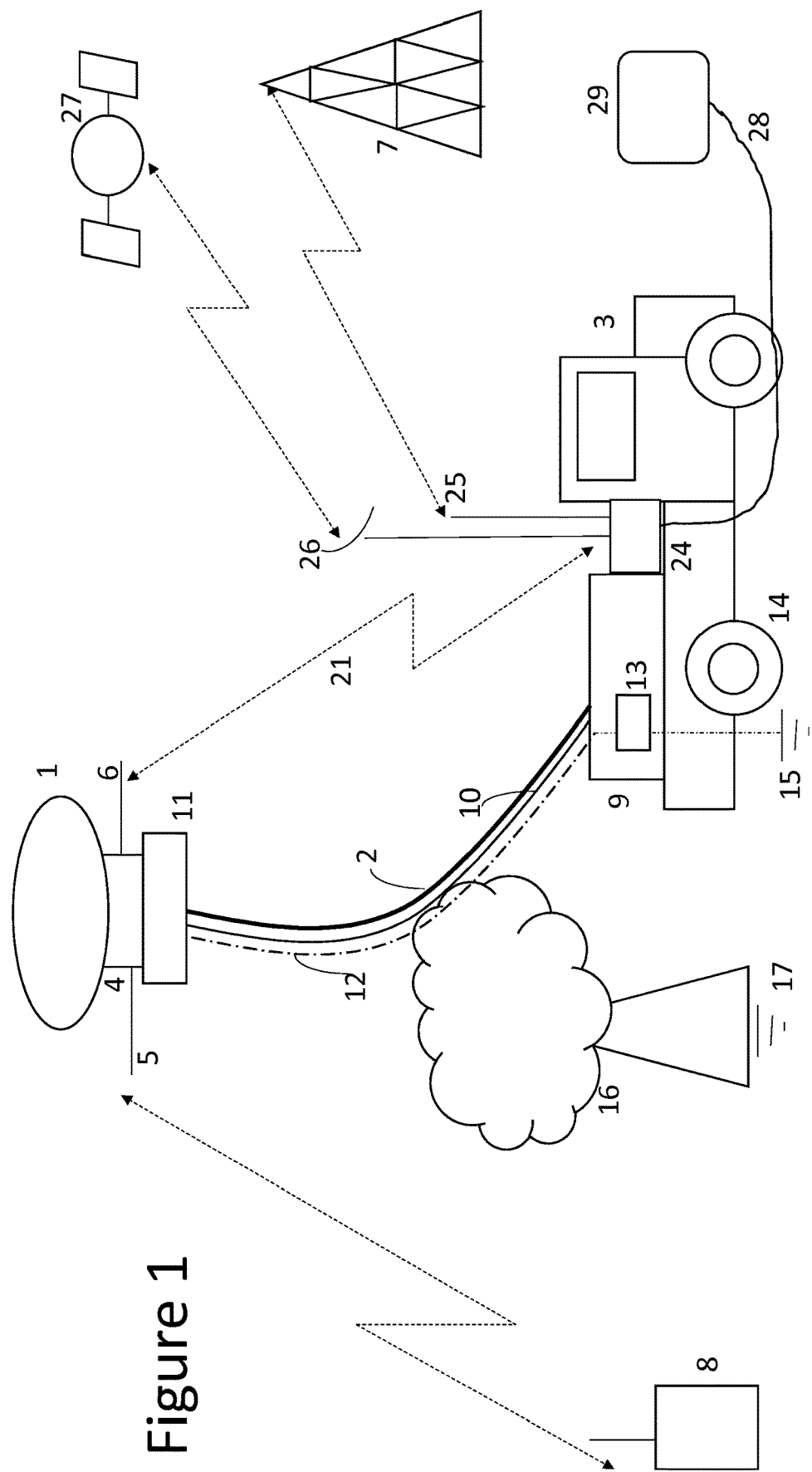
FIG. 1 is a schematic illustration of an airborne device attached by a tether to a mobile ground station.

FIG. 1 depicts an airborne device 1 attached by a tether 2 to a mobile ground station 3. The device 1 may be a balloon or a powered device such as a "drone". Such tethered airborne devices have a number of applications such as for observation, surveying, etc., but in this example it carries communications equipment 4 and antenna 5 for communicating, with user terminals 8, and communication means 6 for communication with a base station 7, 27, 29 such as a mobile communications base station 7, a satellite 27, or an exchange 29 in a fixed network.

For a variety of reasons, it is difficult to establish a direct connection between an airborne device 1 and a base station. Cellular base stations 7 are usually designed to provide a strong signal in the horizontal direction and not waste power transmitting towards the sky where mobile terminals are rarely found. Moreover, because of winds at altitude, it would be difficult to keep an airborne antenna 5 aimed at a base station 7. Similarly, it would be difficult to keep an airborne device locked on to a satellite 27. An exchange 29 in the fixed network necessarily requires a fixed connection 28. Consequently, communications are usually relayed between the base stations 7, 27, 29 and the airborne device 4 by way of a communications relay 24 associated with the mobile ground station 3. An in-band backhaul arrangement may be used in which a 3G/4G signal is received from an existing tower (7) by an antenna 25 on the mobile platform 3. A modem 24 converts that signal into Ethernet protocol and transmits it to the airborne equipment 4 using a wireless link 21 (as shown), or a wired link associated with the tether 2. The airborne equipment 4 then reconverts the signal to 3G/4G for wireless transmission to the User Equipment 8.

If backhaul communication to an existing cellular base station 7 is not possible, alternative backhaul arrangements may include a satellite link 26, 27. Alternatively, in appropriate circumstances, a wired link 28, 29 to a fixed exchange may be available.

A power generator 9 is associated with the ground station 3 for delivering electrical power through a cable 10 associated with the tether 2 to a power management system 11, so that power can be delivered to the onboard communications equipment 4 and, if necessary, to provide power for propulsion of the airborne device 1 to maintain it airborne, hold position, and to control its orientation.

Mechanical strain on an electrical cable could damage it, causing higher resistance resulting in over-heating of the cable, but for a tethered aircraft this can be avoided by having the weight of the electrical cable 10, and any mechanical tensions transmitted from the airborne craft, borne by the tether 2.

In conventional systems an earth connection 12 is provided with the cable 10 to safely discharge electrical power through a safety device such as a circuit breaker 13 in the event of a malfunction in the airborne electrical equipment 11. However, provision of such a connection is inconvenient and can be unreliable. Firstly, on a mobile device a reliable electrical connection to earth can be difficult to establish, especially if the equipment is mounted on a vehicle with rubber tires 14 which insulate it from the earth, in which case a separate earth connection 15 needs to be deployed and firmly fixed to the ground whenever the mobile station 3 is moved to a new location. Secondly, the tether 2 and associated cable 10 are vulnerable to damage, for example if the cable becomes entangled with objects 16 on the ground, or is severed and the loose end falls to the ground. Such situations may not necessarily result in current being discharged through the earth wire 12, especially as the earth wire is no less vulnerable to damage than the rest of the cable 10. In such situations the current delivered from the generator 9 may find an alternative path 16 to earth 17 which may cause fires or other harm to objects, people or livestock. Entanglement of the cable can also result in it stretching and fraying, increasing its resistance as individual strands in the wires come apart or get thinner, which can result in the cable overheating and eventually catching fire.

Figure 2:
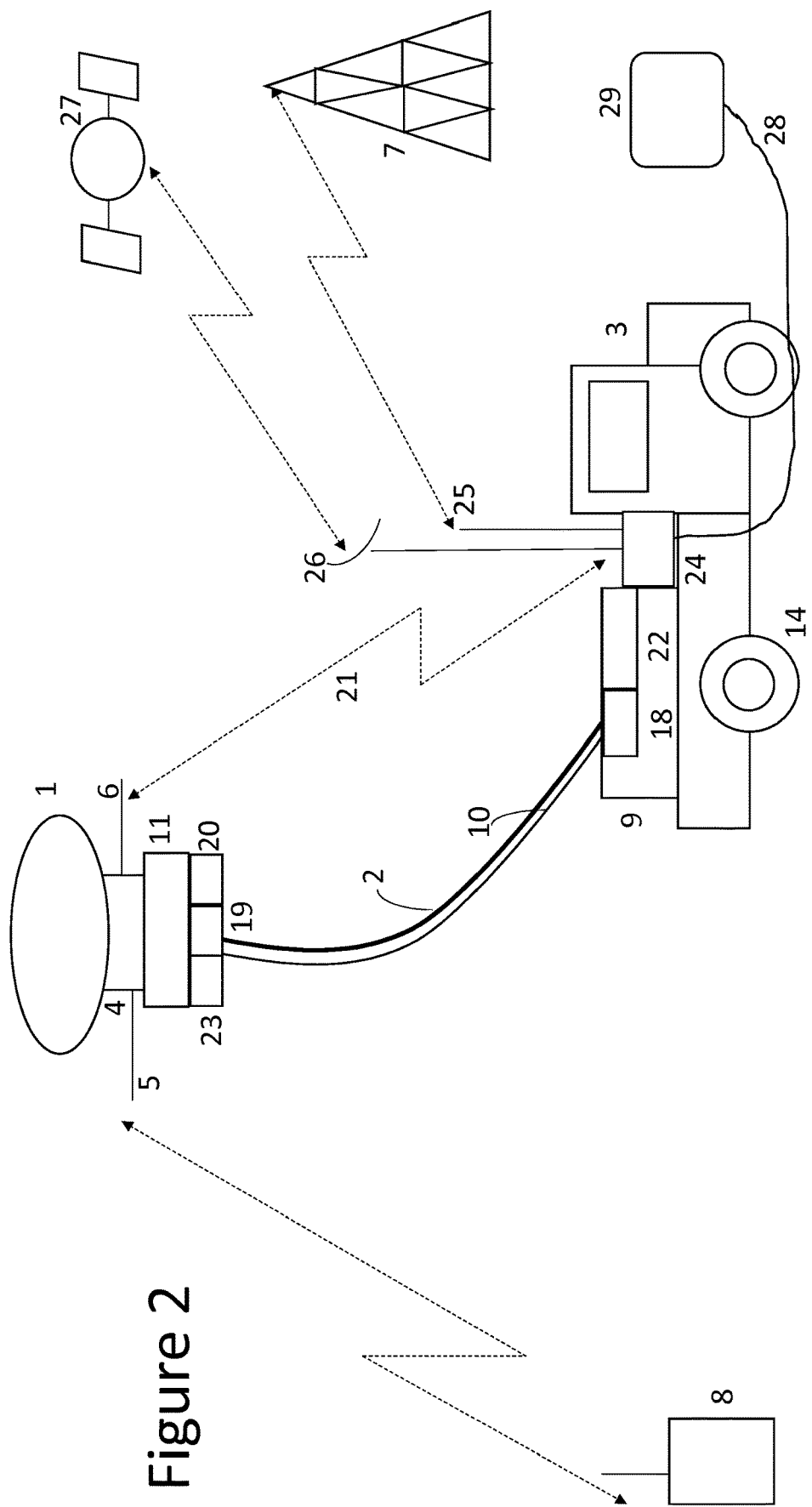
FIG. 2 is a schematic illustration of a system operating in accordance with the disclosure.
Figure 3:
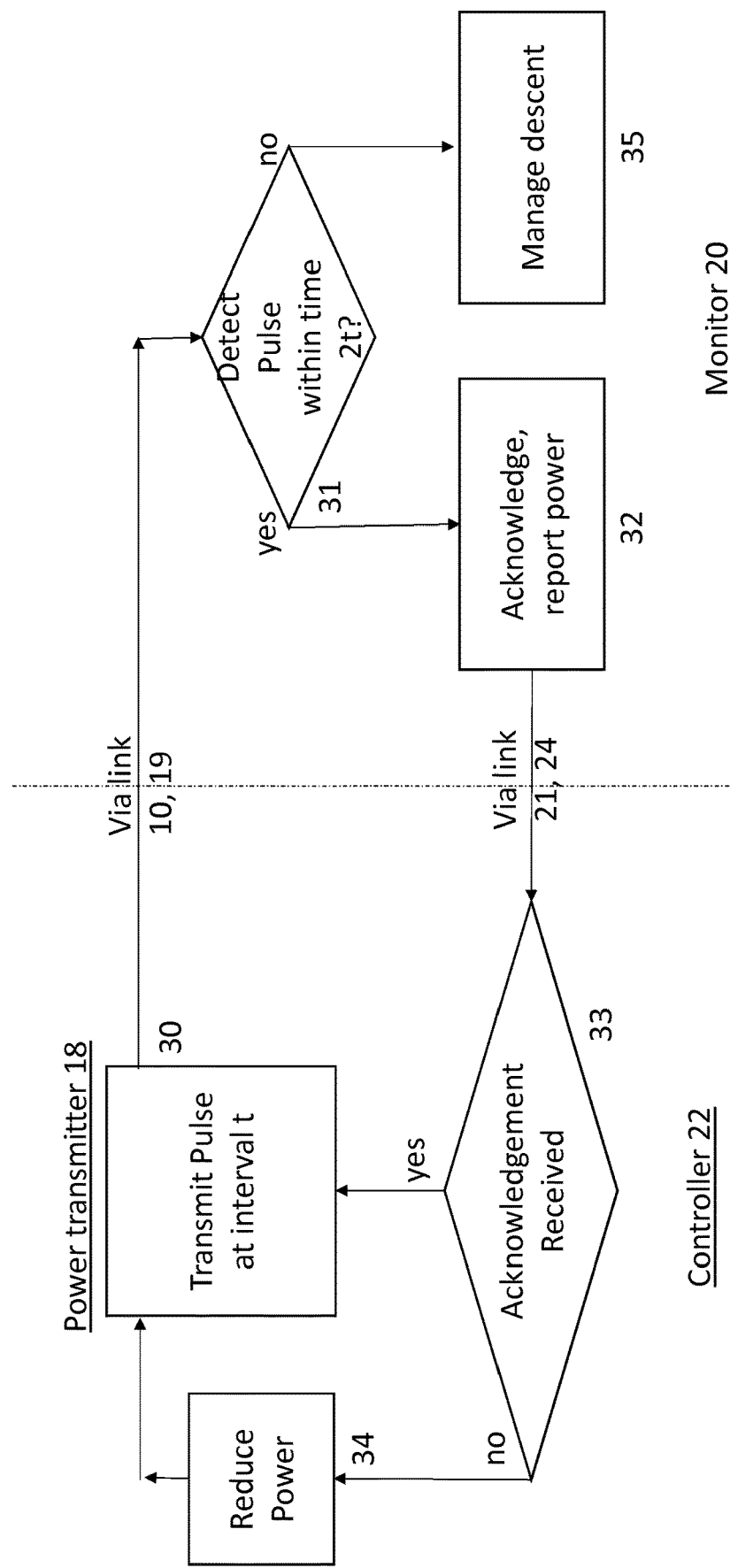
FIG. 3 is a flow chart representing a mode of operation of the system of FIG. 2.

The embodiment of the present disclosure depicted in FIG. 2 and FIG. 3 provides electrical power to an aerial device 1 by way of a cable 10 associated with a tether 2, using a pulsed power supply system 18, 19. A generator 9 generates electrical power, which is delivered to a transmission unit 18 which transmits electrical power in pulses (30) to the cable 10 for delivery to a power-receiving unit 19 which regulates the power for delivery to electrical equipment 11 in the airborne device 1.

A monitoring system 20 detects the arrival of each electrical pulse at the power-receiving unit 19 (31) and determines the power delivered to the receiver 19. The monitoring system 20 transmits a signal to a control unit 22 associated with the ground station 3 (32), indicating the power delivered to the power-receiving unit 19. The signal may be transmitted using a wireless link 21 (as shown), or over a wired link using the cable 2.

The control unit 22 monitors the data received over the link 21 from the monitoring unit 20. In normal operation the monitoring unit 20 reports the delivery of each power pulse (33, see FIG. 3), and the control unit 22 responds by causing a further power pulse to be generated by the transmitter 18.

In the event of an interruption to the integrity of the cable 10, the next power pulse transmitted by the transmission unit 18 will fail to be delivered to the receiver 19, and the monitoring unit 20 will therefore not report its arrival to the control unit 22. As the control unit 22 does not transmit a pulse until the previous one has been acknowledged, no further pulses are transmitted until the fault has been identified and rectified. The system fails safe, because in the event of interruption to the communications link 21, power delivery also ceases.

As the electrical system is designed to cease operation in the event of a failure, an earth connection is not necessary and the entire system can be electrically isolated, making it less vulnerable to damage from electrical storms.

The control unit 22 also monitors the messages transmitted by the monitoring unit 20 for aberrations or discrepancies between the power transmitted in each pulse by the transmitter 18 and the power reported to be received by the power-receiving unit 19, as reported by the monitoring device 20. In the event of a reduction of the power reported, transmission can again be suspended. Damage to the cable 10 can thus be detected, as the current, and therefore power, delivered in a given pulse will be reduced if a short circuit (shunt) is present, as some of the current will pass through the shunt. Likewise if the cable is damaged such that its resistance increases, for example because a foreign body is in series with it, or the cable is damaged by stretching, more power will be lost in the cable, and the power remaining to be delivered to the receiving unit 19 in each pulse will be reduced. In either case, the reduction in power is detected by the monitoring and control system 20, 22. It can be arranged that the monitor 20 only reports receipt of full-power pulses. As no pulse is transmitted unless the previous one is acknowledged, no further pulses are transmitted up the cable 2, and the cable thus ceases to be energized. Alternatively, the monitor 20 may report the power delivered in each pulse, to allow a decision to be made by the control apparatus 22 on the basis of the reported power.

In case of a transitory fault in transmission of power, or of the communications link 20, 21, 22 over which the reception of pulses is reported, the control unit 22 may be arranged such that, in the event of failure to receive acknowledgement of a pulse, it does not immediately shut down the transmission unit 18 but first transmits one or more low-power test pulses (34), capable of detection by the monitoring unit 19 but of a power low enough not to cause damage to objects or people if the cable has indeed been damaged. If these test pulses are acknowledged (31), the control unit 22 causes the transmitter 18 to resume delivery of pulses at full power.

The system is initially calibrated, in one embodiment with the device 1 on the ground and the cable 2, 10 relaxed, to determine the internal resistance of the cable and thus the power expected to be delivered to the receiving unit 19.

Damage to the tether can result in an airborne device breaking free and flying or floating away out of control, with potentially hazardous consequences. Even if the tether remains intact, loss of power for a heavier-than-air device, which requires power to remain airborne, is also hazardous. In the present embodiment, because power is delivered to the aerial device 1 in pulses, the electrical equipment 11 in the aerial device includes an accumulator, battery, or other electrical storage system 23 to smooth out the supply. (This storage system is not required to store electricity for any long periods, and so can be relatively small compared with systems which rely solely on battery power for extended periods.) In the event of power pulses ceasing to be delivered to the power receiver 19 (30), the aerial device 1 is programmed to manage a controlled descent to ground level (35), using the remaining power stored in the accumulator 23. Descent may be achieved by venting of flotation sacs in a lighter-than-air craft, or a low speed descent under power for a device in which lift is generated by powered means. Thus, even if the tether 2 has been severed, the device 1 can be recovered, minimizing the potential hazard from an untethered device.

In the embodiment depicted, pulses are transmitted at regular intervals (with period "t") and descent is not initiated (35) unless two consecutive pulses are missed (31), but this is illustrative. Descent may be aborted if pulses are once again detected.

The invention claimed is:

1. A system comprising:
an aircraft comprising:
   a connection point for a tether;
   an electrical power connection for receiving electrical power through a cable from a remote source;
   a receiving unit for a pulsed electrical delivery system connected through the electrical power connection;
   a monitoring unit for detecting electrical pulses received by the receiving unit; and
   a communications transmitter for transmitting an acknowledgement in response to detection of electrical pulses by the monitoring unit; and
a ground-based device comprising:
   a pulsed electrical delivery system for powering the aircraft, via the cable, using electrical pulses;
   a controller configured to receive the acknowledgement from the aircraft and to cause, from the pulsed electrical delivery system to the aircraft:
      transmission of each electrical pulse in response to receipt by the controller of the acknowledgment of a previous electrical pulse; and
      transmission of one or more electrical pulses at reduced power if no acknowledgment is received by the controller within a predetermined period.

2. The system according to claim 1, further comprising wireless communications equipment powered by the pulsed electrical delivery system, for operation as a communications base station.

3. The system according to claim 1, wherein the communications transmitter is configured to report a power level of electrical pulses detected by the monitoring unit.

4. The system according to claim 1, wherein the communications transmitter transmits the acknowledgment over a wireless interface.

5. The system according to claim 1, wherein the communications transmitter transmits the acknowledgment over a wired communications connection associated with the electrical power connection.

6. The system according to claim 1, configured to enter a controlled descent mode in the event that the monitoring unit detects no electrical pulses within a predetermined period.

7. The system according to claim 1, being a captive balloon.

8. The system according to claim 1, being a tethered powered heavier-than-air craft.

9. A method of delivery of electrical power to an aircraft connected to the ground by a tether, comprising:
   delivering electrical pulses to an airborne aircraft from a ground-based device over an electrical connection;
   detecting, by the airborne aircraft, received electrical pulses;
   transmitting, by the airborne aircraft, acknowledgements of the detected electrical pulses; and
   transmitting, by the ground-based device:
      each electrical pulse in response to the acknowledgement of a previous electrical pulse; and
      one or more electrical pulses at reduced power if no acknowledgment is received by the ground-based device within a predetermined period.

10. The method according to claim 9, wherein the electrical connection is a cable associated with the tether.

11. The method according to claim 9, wherein the acknowledgements are transmitted over a communications line associated with the tether.

12. The method according to claim 9, wherein if the airborne aircraft ceases to detect electrical pulses, the airborne aircraft enters a controlled descent mode.

13. The method according to claim 9, wherein the aircraft is a captive balloon.

14. The method according to claim 9, wherein the aircraft is a tethered powered heavier-than-air craft.

15. The method according to claim 9, wherein the aircraft operates as a wireless communications base station.

16. The method according to claim 15, wherein a backhaul connection to a communications network is provided from the aircraft through the ground-based device.

17. The system according to claim 2, further comprising a control apparatus for disconnecting the wireless communications equipment from a power supply of the pulsed electrical delivery system when the aircraft is not airborne.

18. The method according to claim 15, wherein wireless communications equipment of the aircraft is disconnected from a power supply when the aircraft is not airborne.

* * * * *